(12) United States Patent
Voronkov et al.

(10) Patent No.: US 9,244,671 B2
(45) Date of Patent: Jan. 26, 2016

(54) SYSTEM AND METHOD FOR DEPLOYING PRECONFIGURED SOFTWARE

(71) Applicant: Kaspersky Lab ZAO, Moscow (RU)

(72) Inventors: Konstantin P. Voronkov, Moscow (RU); Stepan N. Deshevykh, Moscow (RU); Victor V. Yablokov, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 0 days.

(21) Appl. No.: 13/851,791

(22) Filed: Mar. 27, 2013

(65) Prior Publication Data

US 2014/0181801 A1 Jun. 26, 2014

(30) Foreign Application Priority Data

Dec. 25, 2012 (RU) ................................ 2012156449

(51) Int. Cl.
*G06F 9/445* (2006.01)
(52) U.S. Cl.
CPC ... *G06F 8/61* (2013.01); *G06F 8/63* (2013.01)
(58) Field of Classification Search
None
See application file for complete search history.

(56) References Cited

U.S. PATENT DOCUMENTS

| | | | |
|---|---|---|---|
| 4,707,828 A * | 11/1987 | Yamada | 370/447 |
| 6,070,244 A | 5/2000 | Orchier et al. | |
| 6,266,811 B1 * | 7/2001 | Nabahi | 717/174 |
| 6,282,711 B1 * | 8/2001 | Halpern et al. | 717/175 |
| 6,606,744 B1 * | 8/2003 | Mikurak | 717/174 |
| 6,675,382 B1 | 1/2004 | Foster | |
| 6,681,266 B2 * | 1/2004 | Ayyagari | 719/331 |
| 6,725,453 B1 | 4/2004 | Lucas et al. | |
| 6,760,761 B1 * | 7/2004 | Sciacca | 709/220 |
| 7,047,529 B2 | 5/2006 | Delo | |
| 7,246,351 B2 | 7/2007 | Bloch et al. | |
| 7,313,792 B2 | 12/2007 | Buban et al. | |
| 7,478,416 B2 | 1/2009 | Edson | |

(Continued)

FOREIGN PATENT DOCUMENTS

EP 2180758 4/2010

OTHER PUBLICATIONS

Creating Software Installation Packages with SMS Installer., Microsoft System Center. Jan. 15, 2013. http://technet.microsoft.com/en-us/library/cc180641.aspx.

(Continued)

*Primary Examiner* — Jason Mitchell
(74) *Attorney, Agent, or Firm* — Patterson, Thuente, Pedersen, P.A.

(57) ABSTRACT

Automated deployment of a software application to be installed via a software installation package onto different user devices for different users. An initial software installation package, is obtained, along with information representing (a) associations between the users and the user devices, (b) user attributes from which access privilege level information for individual users is determinable, and (c) device attributes for each of the plurality of user devices, including network connectivity information. The initial software installation package is custom-configured for individual user devices based on the information representing (a) and (b) to produce a different specially-configured software installation packages. Each one includes installation parameters that establish functionality for the software application based on the access privilege level of the corresponding user. Data transfer channels are custom-configured for individual user devices based on the information representing (a) and (c).

23 Claims, 5 Drawing Sheets

(56) References Cited

U.S. PATENT DOCUMENTS

| | | | |
|---|---|---|---|
| 7,506,338 B2 | 3/2009 | Alpern et al. | |
| 7,516,480 B2 | 4/2009 | Pearson et al. | |
| 7,536,686 B2 | 5/2009 | Tan et al. | |
| 7,571,207 B2 | 8/2009 | Yoshizawa et al. | |
| 7,584,300 B2* | 9/2009 | Fukuzato | 709/240 |
| 7,596,620 B1 | 9/2009 | Colton et al. | |
| 7,730,480 B2 | 6/2010 | Isaacson | |
| 7,730,482 B2* | 6/2010 | Illowsky et al. | 717/177 |
| 7,735,063 B2 | 6/2010 | Herzog et al. | |
| 7,805,495 B2 | 9/2010 | Marmaos | |
| 7,823,147 B2 | 10/2010 | Moshir et al. | |
| 7,831,734 B2 | 11/2010 | Bernhard et al. | |
| 7,877,804 B2 | 1/2011 | Khanolkar et al. | |
| 7,890,925 B1 | 2/2011 | Wyatt et al. | |
| 7,912,929 B2 | 3/2011 | Styles | |
| 7,945,906 B2 | 5/2011 | Bourke-Dunphy et al. | |
| 7,945,955 B2 | 5/2011 | Katkar et al. | |
| 7,996,610 B2 | 8/2011 | Wan et al. | |
| 7,996,879 B1 | 8/2011 | Fang et al. | |
| 8,006,241 B2 | 8/2011 | Dias | |
| 8,015,559 B2 | 9/2011 | Nakano et al. | |
| 8,074,214 B2 | 12/2011 | Isaacson et al. | |
| 8,086,582 B1 | 12/2011 | Wills et al. | |
| 8,117,317 B2 | 2/2012 | Klimentiev et al. | |
| 8,131,281 B1 | 3/2012 | Hildner et al. | |
| 8,181,253 B1 | 5/2012 | Zaitsev et al. | |
| 8,230,415 B1 | 7/2012 | Thomas | |
| 8,316,357 B2 | 11/2012 | Mosier et al. | |
| 8,332,464 B2 | 12/2012 | Dispensa et al. | |
| 8,392,911 B2 | 3/2013 | Delahunty et al. | |
| 8,407,682 B2 | 3/2013 | Reisman | |
| 8,418,168 B2 | 4/2013 | Tyhurst et al. | |
| 8,464,249 B1 | 6/2013 | Goldman et al. | |
| 8,473,598 B1 | 6/2013 | Piper | |
| 8,635,609 B2 | 1/2014 | Deblaquiere et al. | |
| 2002/0083429 A1* | 6/2002 | Rozenfeld et al. | 717/174 |
| 2003/0018964 A1* | 1/2003 | Fox et al. | 717/177 |
| 2003/0208569 A1 | 11/2003 | O'Brien et al. | |
| 2004/0147253 A1* | 7/2004 | Fukuzato | 455/418 |
| 2005/0160420 A1 | 7/2005 | Kruta et al. | |
| 2005/0223376 A1* | 10/2005 | Morris | 717/177 |
| 2006/0173979 A1 | 8/2006 | Roellgen | |
| 2006/0217133 A1* | 9/2006 | Christenson et al. | 455/461 |
| 2007/0157288 A1 | 7/2007 | Lim | |
| 2007/0198664 A1 | 8/2007 | Satkunanathan et al. | |
| 2007/0223917 A1* | 9/2007 | Nagamine | 398/1 |
| 2007/0283344 A1* | 12/2007 | Apte et al. | 717/174 |
| 2008/0034200 A1* | 2/2008 | Polcha et al. | 713/153 |
| 2008/0147452 A1* | 6/2008 | Renz et al. | 705/7 |
| 2008/0183848 A1 | 7/2008 | Zilbershtein et al. | |
| 2008/0244557 A1* | 10/2008 | Yeung et al. | 717/173 |
| 2008/0276295 A1 | 11/2008 | Nair | |
| 2008/0289018 A1* | 11/2008 | Kawaguchi | 726/9 |
| 2008/0313630 A1* | 12/2008 | Morris | 717/177 |
| 2009/0068980 A1 | 3/2009 | Creswell et al. | |
| 2009/0094462 A1 | 4/2009 | Madduri | |
| 2009/0094670 A1 | 4/2009 | Park | |
| 2009/0320019 A1 | 12/2009 | Ellington et al. | |
| 2010/0050172 A1 | 2/2010 | Ferris | |
| 2010/0169497 A1 | 7/2010 | Klimentiev et al. | |
| 2010/0169876 A1* | 7/2010 | Mann | 717/170 |
| 2010/0228836 A1 | 9/2010 | Lehtovirta et al. | |
| 2011/0022653 A1 | 1/2011 | Werth et al. | |
| 2011/0035287 A1 | 2/2011 | Fox | |
| 2011/0179151 A1 | 7/2011 | Sedukhin et al. | |
| 2011/0214116 A1 | 9/2011 | Vidal | |
| 2011/0289585 A1 | 11/2011 | Zaitsev et al. | |
| 2012/0036245 A1 | 2/2012 | Dare et al. | |
| 2012/0072882 A1* | 3/2012 | Hoff | 717/102 |
| 2012/0150796 A1 | 6/2012 | Martick | |
| 2012/0185933 A1 | 7/2012 | Belk et al. | |
| 2012/0216294 A1 | 8/2012 | Hahn et al. | |
| 2012/0284704 A1 | 11/2012 | Friedman et al. | |
| 2012/0297041 A1 | 11/2012 | Momchilov | |
| 2012/0311144 A1 | 12/2012 | Akelbein et al. | |
| 2012/0311659 A1 | 12/2012 | Narain et al. | |
| 2013/0061218 A1* | 3/2013 | Moore et al. | 717/177 |
| 2013/0067461 A1 | 3/2013 | Taragin et al. | |
| 2013/0125208 A1 | 5/2013 | Doukhvalov et al. | |
| 2013/0159476 A1 | 6/2013 | Hilburn et al. | |

OTHER PUBLICATIONS

Window Installer (Windows) as accessed on Mar. 27, 2013. http://msdn.microsoft.com/en-us/library/cc185688(v=vs.85).aspx.

Application and File History for U.S. Appl. No. 13/851,811, filed Mar. 27, 2013, inventors Voronkov et al.

Tyndall, "Building an Effective Software Deployment Process", ACM pp. 109-114. (2012).

Dolstra et al., "Imposing a Memory Management Discipline on Software Delpoyment", IEEE . pp. 1-10. (2004).

Manna, "Dynamic Software Update for Component-based Distributed Systems", ACM. pp. 1-8. (2011).

Pukall et al., "JavAdaptor: Unrestricted Dynamic Software Updates for Java", ACM. pp. 989-991. (2011).

European Search Report for European Application No. 13195208.7-1856 dated Feb. 25, 2014.

ComUnity: Welcomes You: Extend and Operate your business model by delivering rich application services to all mass-market mobile devices as accessed on Jun. 26, 2013. 2 pages, http://www.comunity.co.za/index.php.

Push Notifications for Windows Phone dated May 31, 2013, accessed on Jun. 26, 2013, 2 pages http://msdn.microsoft.com/en-us/library/windowsphone/develop/ff402558(v=vs.105).aspx.

Android Cloud to Device Messaging Framework as accessed on Jun. 26, 2013. 9 pages, https://developers.google.com/android/c2dm/.

About Local Notifications and Push Notifications as accessed on Jun. 26, 2013. 5 pages. http://developter.apple.com/library/ios/#documentation/NetworkingInternet/Conceptual/RemoteNotificationsPG/Introduction.html.

Oberheide et al, "Virtualized in-cloud services for mobile devices" Proceedings of the 1st workshop on virtualization in Mobile Computing, ACM. 2008 pp. 31-35.

* cited by examiner

SYSTEM AND METHOD FOR DEPLOYING PRECONFIGURED SOFTWARE

PRIOR APPLICATION

This Application claims the benefit of Russian Federation Patent Application No. 2012156449 filed Dec. 25, 2012, incorporated by reference herein.

FIELD OF THE INVENTION

The invention relates generally to information processing and communications technologies and, more particularly, to automated selective deployment of a software application to be installed via a software installation package.

BACKGROUND OF THE INVENTION

When managing computer network security, network administrators often face the difficulty of setting up the security software being installed on various devices. Solving this problem becomes especially important when deploying software (for example, an antivirus or access control systems) at large companies or in local area networks where the configurations of the devices connected to the network are significantly different from one another.

Another factor complicating the installation process of new software is the diversity of the user groups who have different access rights to the resources of an enterprise private network (EPN). The distributed infrastructure of EPNs often involves the use of various security policies, depending on the device, the network segment, and the user. It is impossible to consider all the above factors when installing software on network devices using the existing technical solutions.

The ongoing development of computer equipment increases the complexity of not only infrastructure, but also of security applications. A typical user is unable to optimally configure a security application due to lack of expertise and to company policies that aim to increase the level of security.

In general, remote administration tools are used to manage remote work stations (e.g., user devices). This allows administrators to set up security tools after their installation on desktop or notebook computer systems or on corporate devices with an installed administration agent. However, administration agents cannot be installed on all computer systems. In today's world, there is a trend of increasing presence of personal devices that have no installed administration tools. Such devices include, for example, smartphones, tablet computers, netbooks and other portable devices, which the users utilize for work and oftentimes also for personal purposes. For secure operation on an enterprise private network, the installation of security tools and the subsequent setup of such tools must be performed on the user's side.

More generally, there is a need for an effective and efficient solution for automatically deploying preconfigured software for installation on user devices that operate on a computer network subject to various security policies.

SUMMARY OF THE INVENTION

One aspect of the invention is directed to a system for automated deployment of a software application to be installed, via a software installation package provided over a computer network, onto a plurality of different user devices for a plurality of different users. In the system, a set of instructions is executable by computing hardware and stored in a non-transitory storage medium that, when executed, cause the computing hardware to implement a task manager module and a configurator module.

The task manager module obtains an initial software installation package, and communicates with a network attributes data store via the computer network to obtain information representing (a) associations between the plurality of users and the plurality of user devices, (b) user attributes from which access privilege level information for individual users is determinable, and (c) device attributes for each of the plurality of user devices, including network connectivity information.

The configurator module custom-configures the initial software installation package for individual ones of the plurality of user devices based on the information representing (a) and (b) to produce a plurality of different specially-configured software installation packages, each one of which corresponds to one or more specific users and one or more specific user devices. Also, each specially-configured software installation package includes installation parameters that establish functionality for the software application based on the access privilege level of the corresponding one or more specific users.

The configurator module further custom-configures data transfer channels for individual ones of the plurality of user devices based on the information representing (a) and (c), each data transfer channel corresponding to one or more specific users and one or more specific user devices. Each data transfer channel is associated with a selected data transfer protocol determined by the configurator module to be suitable for the one or more specific user devices.

The software application can be a security application user agent in one type of embodiment. In other embodiments, the software application is any deployable-software, such as productivity applications (e.g., word processing, spreadsheet, and the like), business system software, CAD/CAM software, database applications, etc.

In a related embodiment, the configurator module is adapted to produce each specially-configured software installation package such that the installation parameters establish functionality based further on the device attributes corresponding to the one or more user devices. In another related embodiment, the task manager module is adapted to obtain information representing a security policy, and wherein the configurator module is adapted to produce each specially-configured software installation package such that the installation parameters establish functionality based further on that security policy.

In one type of embodiment, the configurator module is communicatively coupled to a data delivery service module that supplies a link to a data store from which each specially-configured software installation package is downloadable by each user device. In a related embodiment, the configurator module is communicatively coupled to a mobile device administration module that supplies a link to a data store from which each specially-configured software installation package for user devices that are mobile devices is downloadable by each user device via a messaging service specific to mobile devices.

Another aspect of the invention is directed to a method for automated deployment of a software application to be installed, via a software installation package provided over a computer network, onto a plurality of different user devices for a plurality of different users. The method includes:

obtaining an initial software installation package, and information representing (a) associations between the plurality of users and the plurality of user devices, (b)

user attributes from which access privilege level information for individual users is determinable, and (c) device attributes for each of the plurality of user devices, including network connectivity information;

custom-configuring the initial software installation package for individual ones of the plurality of user devices based on the information representing (a) and (b) to produce a plurality of different specially-configured software installation packages, each one of which corresponds to one or more specific users and one or more specific user devices, wherein each specially-configured software installation package includes installation parameters that establish functionality for the software application based on the access privilege level of the corresponding one or more specific users; and custom-configuring data transfer channels for individual ones of the plurality of user devices based on the information representing (a) and (c), each data transfer channel corresponding to one or more specific users and one or more specific user devices, wherein each data transfer channel is associated with a selected data transfer protocol determined to be suitable for the one or more specific user devices.

BRIEF DESCRIPTION OF THE DRAWINGS

The invention may be more completely understood in consideration of the following detailed description of various embodiments of the invention in connection with the accompanying drawings, in which.

Figure 1:
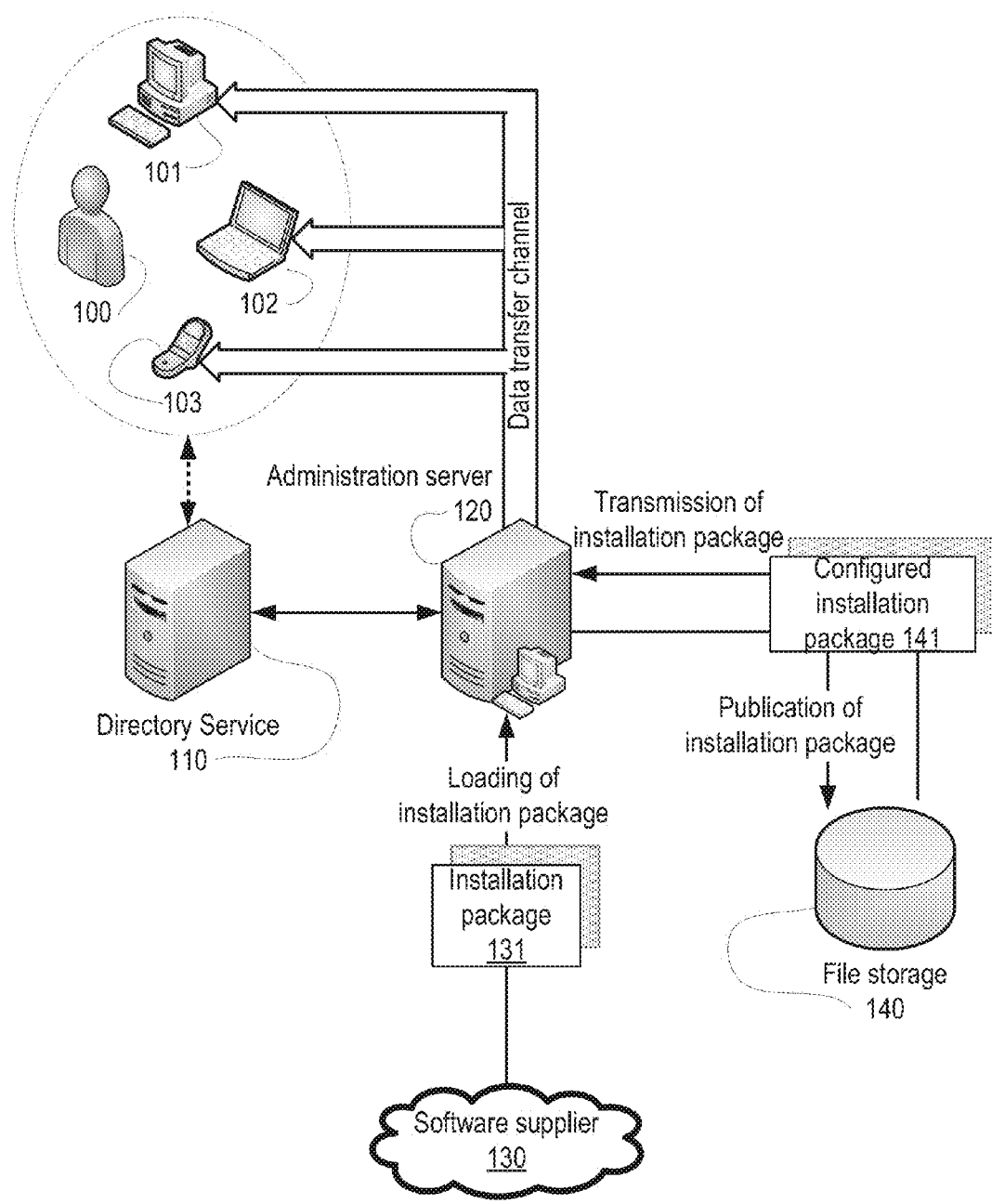
FIG. 1 is a block diagram illustrating a high-level system architecture for an automated software deployment system according to one embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Aspects of the present invention are directed to deployment of specially-configured software on an enterprise private network (EPN). In the present context an EPN is a computer network operated by an organization such as a company, educational institution, a governmental agency, a non-governmental organization, a non-profit organization, or the like, and is not limited to any particular network architecture, whether host-based, or content-based, etc. An EPN can connect to a public network such at the Internet, or to other private networks.

A system for deployment of pre-configured software, in one of the embodiments, includes a task manager module, an analyzer module and a configurator module, installed on an administration server.

The term module as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more computers (e.g., cluster nodes) that execute an operating system, system programs, and application programs, while also implementing the module using multitasking, multithreading, distributed (e.g., cloud) processing where appropriate, or other such techniques. Accordingly, each module can be realized in a variety of suitable configurations, and should generally not be limited to any particular implementation exemplified herein, unless such limitations are expressly called out.

In operation, a system according to an example embodiment carries out a process for deployment of pre-configured software in stages, where: a) on the administration server, a task is created for installation of software to a user device; b) from the computer network attributes data store, attributes of such objects are loaded which match the user's account and correspond to the user-controlled device on which it is planned to install the software; b) the software installation package and data transfer channel are configured, determining the configuration parameters by the loaded attributes in accordance with the security policy set for that user and for that device; d) the installation tasks are launched for execution; in this case, the configured installation package is loaded to the user device through the data transfer channel, and the software is installed in accordance with the configuration parameters.

Related embodiments facilitate the installation of software to a user's mobile device. In those embodiments where the software represents a security agent, the installation package configuration parameters include the following parameters: setup parameters for the protection components of the security agent; parameters of the installation of the security agent on the user device; parameters of the network connection with the administration server; parameters for inclusion of the protection component into the security agent; parameters for adding a security certificate.

The installation package configuration parameters in a particular embodiment are determined by the user's and the device's attributes, which include: the user's role in the company; the user device's configuration; the parameters of the network connection with the administration server; a list of accessible network resources; the user's workplace. In a related embodiment, the attributes are loaded from a directory service.

The installation package can contain a configuration file, an installation file, and a security certificate, for example of security agents (antivirus, firewall, antispam, web antivirus and other security systems). The automation of the installation reduces the number of operations performed by the administrator when creating an agents deployment task and reduces the number of created tasks. The use of this technology allows to make the process of installation and first setup of a security tool transparent for the user. This invention can be also used for other types of software, such as office applications, database clients and other programs.

Another distinctive feature of this invention, as compared to the existing technology level, is automatic setup of a channel for the transfer of the installation package to a user device. Automatic setup includes the selection of a transfer channel depending on the device type and user account type, and the establishment of data transfer parameters. For example, the creation of a link to the installation package in a format corresponding to the data transfer channel.

Ensuring reliable EPN security is facilitated by a distributed system of security applications, each of which has a specific functionality and is installed on end devices of a network. When implementing security applications, such as an antivirus module, the diversity of the end computer devices to be protected, i.e. multiple software and hardware configurations, is taken into account.

The types of user devices on the network to be protected are not limited to desktop computers and servers installed by a company's system administrator; also included are personal user devices, on which unsafe software may be installed and which may represent a data leakage channel. Personal devices should preferably be protected and monitored when performing service operations, for example, when working with corporate resources (data, applications, network connections). The difficulty lies in the fact that such devices do not have remote administration and control tools. Therefore, the setup of security tools is performed by the user; this creates a number of difficulties for the technical support services and for the security service. A description of an option to solve this problem will be provided in this document.

The specification of an EPN, including network connection parameters, a list of network services, and the configuration of network devices, can be presented in a network attributes data store, such as, for example, a directory service. This type of data store can be implemented as a tree structure stored centrally or in distributed fashion on the EPN, and containing objects representing the various user devices and their attributes, which characterize the parameters of such devices. One example of a directory service is defined by the LDAP protocol and can be used by outside programs and services, including administration tools, for adaptive setup of security tools, taking into account the EPN specifications.

From the state of the art, other methods for presenting data on network resources and their connections are known; such methods are implemented, for example, in databases, XML files and other sources. Aspects of the invention are not limited to the integration of an administration server with a directory service. Thus, in the present context, the term network attributes data store refers to any suitable arrangement for storage and presentation of information about network users and devices.

An antivirus application is a ubiquitous element of EPN protection. Today's antivirus solutions include functionality going beyond mere verification of files for the presence of a malicious code. As used in the present context, an antivirus tool or module should be understood as referring to a multi-functional computer security application. Depending on the type of the antivirus application, the functional capabilities include computer system protection, information protection, control, and synchronization with other security tools. The architecture of an antivirus tool for an EPN can be complex and can include multiple modules installed on various EPN nodes. The modules installed on end devices of a network, including personal devices of EPN users, can vary and will be referred to herein as security agents.

A user of a device operating on the EPN is generally a company employee or authorized visitor registered on the network. In accordance with typical practice, at the time of hiring, an account is created for each employee; the account is used to store personal information, such as user name, birth date, position, and passwords, keys, or other access credentials necessary for the user to gain access to corporate resources. For company visitors, a separate profile is generally created, which limits their rights for access to network resources. In order to work on the computer network and to gain access to the network resources and applications, the user must pass an authentication. A directory service is perhaps the most common service for ensuring control over access and accounting of users and network resources. There are standards for structuring network objects on which the most popular directory service designs are based. Therefore, most computer networks in companies include a standard service containing necessary information about the users.

Depending on the network structure, directory service users can be divided into groups. A group is used to combine users by a certain characteristic and for inheritance of the group's specifics by all users belonging to the group. For example, a group can combine employees by offices, by the company's structural units, by the granted level of access to information, or by other characteristics. Each group, as well as each account, contains attributes which characterize connection parameters, rights of access to specific resources and applications of the network. Such structure of storage and safe presentation of data on the network objects, implemented in a directory service, allows to implement the security policy adopted at the company.

One of the criteria during the categorization of users is their position at the company and their access to valuable information presenting commercial or government secrets. Accordingly, the information security requirements for the company management are more strict than for the ordinary employees. The categorization of users can be performed dynamically, by adding a user to a group depending on the behavior, connections, personal characteristics and dynamics of the changes in the security rating of the user. A more detailed description of user categorization tools by the above-mentioned factors is provided in U.S. Pat. No. 8,181,253, the disclosure of which is incorporated by reference herein.

FIG. 1 is a block diagram illustrating a high-level system architecture for an automated software deployment system according to one embodiment. On a network composed of devices (servers, desktop computers 101, notebooks 102 and portable devices 103) and offering a number of services (mail service, web service, antivirus protection service and others) for the users 100, a directory service server 110 is often used to organize the management of such resources. This server contains a database for organized storage of the information about the network and allows to automate most management tasks, which include, for example, setting up applications and network connections and sharing access rights. The interaction with the directory service 110 is performed using a standard protocol. As one of the embodiments, a system will be discussed which interacts with an LDAP (Lightweight Directory Access Protocol)-compatible directory service 110.

When a system administrator or a security service specialist creates a task of deploying security agents or another application on network devices, one item to be loaded is the installation package 131 from a software supplier 130; the package is saved in the file storage 140. In the case of a security agent, the software is supplied by a company which develops the security tool, or by a software distributor. The installation packages and the installation files (if they are not included in the installation packages) used to install programs on user devices, including installers of security agents, are stored in the file storage 140. The files which are to be loaded to EPN devices are published. The publication generally involves providing an interface for the loading of the package and for the setup of the relevant access rights for the devices and the users. The file storage can include a file server, a directory on the administration server, a database, or any other data storage tool providing access to the files.

The network administrator performs all the actions on the administration console, which is a management terminal of the administration server 120. Once the installation package is loaded, the group of devices is determined on which the program is to be installed. The group of devices is specified during the creation of the task or is defined automatically. For example, a group of devices can be automatically defined by all devices connected to the network for the first time, or by all devices on which no security agent is installed, and can add them when creating the deployment task.

For each device or for each user of a device included in the device list or in the group task user list, the relevant classes and attributes from the directory service 110 are defined. These data are used to set the parameters for the security agent or for another application to be installed, using expert rules. For each device, a separate set of parameters is created, which is used in the configuration of the installation package for that device. The configured installation packages 141 are saved in the file storage, upon which hyperlinks are sent to network devices. The loading to the end devices can be performed through data transfer channels, which vary by their sharing environment, network parameters or pathways, data transfer protocols and applications. For example, the same file can be transferred using the Ethernet or Wi-Fi network, a TCP protocol or a UDP protocol. The choice of a data transfer channel and of its parameters can also be based on the directory service data and depends on the network infrastructure and on the device configuration.

Aspects of the invention are directed to processes for configuring and deploying security agents and the systems constructed to be used to that end.

Figure 2:
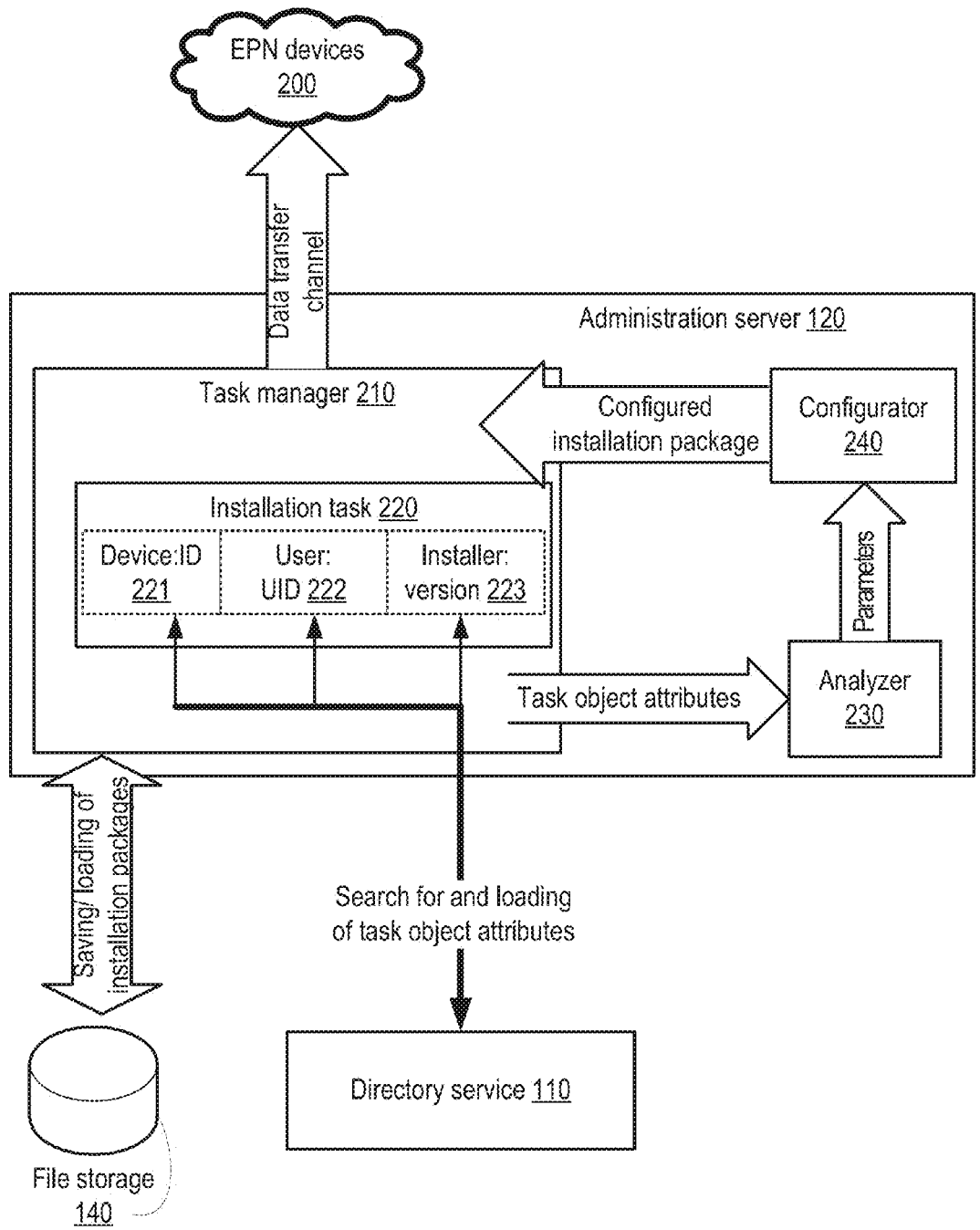
FIG. 2 is a diagram illustrating additional details of the system of FIG. 1 according to one embodiment.

FIG. 2 is a diagram illustrating additional details of the system of FIG. 1 according to one embodiment. The components of this system can be installed on a separate network server or implemented in the form of a virtual machine or as a service for an administration server. The description of the implementation of a task manager module, a configurator module, and an analyzer module as part of administration server 120, which includes, or is coupled to, a file storage arrangement 140. The system is also connected to and interacts with the directory service 110 and EPN user devices 200.

In this example, administration server 120 is a tool for centralized management of an integrated security system, which grants the administrator access to detailed information about the corporate network's security level and facilitates flexible setup of all security system components. The administration server 120 manages the security agents which ensure the security of the end devices of the EPN.

In general, policies are tools for remotely administering the security-related parameters on user devices. Policies are used to set parameters related to the overall product, interface parameters and security component parameters. A policy is used both, to set up parameters and to monitor their utilization on computers. The parameters of a policy are sent to client computers as scheduled or in case of their change.

Administration work is planned through tasks, which include: an update task, a report-building task, a scanning task, a security agent installation task, and others. Tasks can be created for a device or a group of devices, depending on the established goals. The administration server allows to deploy a security system for a specified group of devices. The administrator can quickly configure and install security agents using installation packages.

The creation of a task includes several stages:
  Selection of the task type (installation, update, security agent setup, etc.);
  Setting of the task parameters;
  Selection of the group of objects for the task being managed;
  Setting up the execution schedule.

During the operation of the remote installation master or during the creation of an installation task in the task manager 210, the administrator defines the list of devices and/or groups of devices 221, on which it is needed to install the security agents, and the version of the program 223 being installed, to which a certain set of installation files correspond. The administrator can specify a list of users and/or groups of users in addition to, or instead of, a group of devices as the targets for installation. According to various embodiments, any attributes installed in the directory service and unique for the device may be used as device and user identifiers. A link to installation files (installation package), a name or any other application ID can be used as the installation package version ID, for example.

During the creation of an installation task 220, it is possible to choose target devices from a list. This list is built by the administration server 120 through network scanning. The scanning is performed periodically using various known methods.

One method for scanning a network involves the administration server 120 gathering lists of network computers exactly in the same manner as it is performed by an operating system (e.g., Windows® by Microsoft Corporation). This scanning method is called fast network scanning Building and providing the computer list is the responsibility of the Computer Browser service. During a full network scan, the administration server 120 goes through the list obtained as a result of a fast scan, and attempts to connect to each computer using the NetBIOS protocol. The purpose of this poll is to identify the computers' IP addresses and operating systems. Another method for obtaining device lists is to use a directory service, for example, Active Directory. Scanning of networks is another option for obtaining a list of devices. This involves sending an echo request to all addresses of the specified ranges. Mobile device management (MDM) tools, an Exchange Active Sync protocol, or a special protocol of the administration server 120 can be used to obtain lists of mobile devices.

By default, the administration server 120 includes at least one group of computers. This setup forces the administrator to use a single protection policy for all computers. Even in small networks, it is generally convenient, and sometimes necessary, to use different protection settings for servers and user devices. In large networks, where different user groups use different specialized programs, the possibility to create policies with different exceptions for different users is quite convenient. In order to apply different policies, the devices can be assigned to different groups.

In large EPNs, administrators also create groups to organize the implementation process. For example, computers without a security agent or protection tools are put in the "Deployment" group, where a task of automatic security agent installation is created. Computers with an installed agent are put in the "Compatibility Check" group, where incompatible program removal tasks are created, etc. Finally, fully protected computers are moved into a permanent management structure.

The groups of users, devices and other network objects on the administration server and in the directory service can be synchronized, can complement each other, or can be unrelated. In the case where a group of devices selected during the creation of an installation task is not contained in a directory service in an obvious form, that group of devices can be viewed as multiple separate devices, each of which is represented in the directory service. A similar representation can be built for the users.

The administration server 120 can contain information on the connection between the users 100 and the devices (101-103) and can identify a user 100 by a specified device or vice versa. Therefore, the policy and the tasks for the devices can be transmitted to the relevant user accounts. In the scope of this description, we will discuss examples of managing devices and device groups on an EPN, though this example should not be viewed as limit the possibilities of the system and method described herein, as the comparison of devices and users allows to implement the proposed solution to manage both a single user and a group of users.

The administration server 120 can download information on the distribution of groups and computers, as well as their parameters, from the directory service 110. This can also be performed in an automatic mode, which allows to synchronize data in the directory service 110 and on the server 120. Additionally, the administration server 120 can store information (for example, device check parameters or user security ratings) in the directory service 110, for which it is necessary to complement the structure of the directory service 110.

Below is an example of an installation package 131 used to install programs in operating systems of the Windows® family of operating systems. An installation package 131 is a file which has the extension .msi and contains all the information required for the installation. The processing of this type of file and the performance of the installation process is the responsibility of a special component of the operating system, Windows Installer (a Windows installation manager).

A .msi file is a compound document containing a database which stores various information on the product and the installation process. All string data are stored in a separate part of the document, while the database tables contain pointers to the relevant data. In addition to the database, the structure of an .msi file allows to complement the file with user scenarios, scripts, and supplementary dynamic libraries, if they are required for the installation. The files being installed can be part of the installation package 141, or can be stored separately in compressed or uncompressed form.

The installation process includes several stages:
    gathering of information (determining the installation directory, the source of the installation files, the connection parameters, setting up the update parameters, etc.);
    execution of the installation (copying files, making changes to the system registry);
    going back to any installation stage, including cancellation of the installation (in case of error or exit from the installation program).

Each installation stage involves a sequence of actions (instructions) written in a database. Most actions are standard actions usual for a typical information gathering and installation process. The user can define a specialized set of actions. The user-defined actions can be either written in one of the script languages built in the operating system (JScript or VBScript), or located in a specially created library of functions (using C or C++ programming languages for a Windows family operating system (OS). A more detailed description of the format of installation packages and embodiments is provided in the MSDN documents library, available at http://msdn.microsoft.com/en-us/library/cc185688(v=vs.85).aspx, and incorporated by reference herein. Aspects of the invention are not limited to the use of this format of the installation packages 131 and can also support other formats, depending on the device's operating system, for example, RPM (Red Hat Package Manager) for the OC Linux family, and deb (Debian OC project).

The above-described possibilities, included as standard items in installation package 131, allow to change (supplement) the issued versions of programs without changing the program code and without re-compiling the executable files.

In one embodiment, a special version of the installer is created by making changes to the installation package 131. An example of such a change can be supplementing the installation package's database with program parameters and instructions which allow to automatically apply the parameters to the program. This feature allows automating the installation process and to optimize the installation management process by reducing the number of operations to be executed and by reducing the number of the tasks created by the administrator.

Advantageously, aspects of the present invention provide an improvement that facilitates deployment of a program on all required network devices, including devices located or organized into different structural groups, by creating a single installation task and using a single standard version of the program. In this case, an installation without additional user actions will take into account the specifics of the device and of the user. After the installation of the program, the parameters (settings) relevant for the user 100 and for the device (101-103) are applied. This result is achieved by configuring and installing an installation package which is unique for the user and device combination.

A directory service 110 is a module for hierarchical representation of company resources and of the information about such resources. Resources can mean personnel, network resources, programs, etc. An example of implementation of a directory service is Active Directory, which is most often used for EPN administration. Active Directory has a hierarchical structure composed of objects. Objects are divided in three main categories—resources, services, and user and computer accounts. Active Directory provides information on objects, allows to organize objects, and manage access to them, and sets security rules. An object is uniquely defined by its name and has a set of attributes, i.e. characteristics and data it can contain; the latter, in turn, depend on the object type. In the scope of this application, storage of information on the users and their devices is a key feature of the directory service 110. Access to the directory service data is gained by requests, after which the directory service 110 performs a search and provides information. The main structure of the Active Directory has a number of classes storing information on users, for example:

"Organizational-Person"—a class providing information on the user's position in the company's structure (title, role, unit, office, room, etc.);

"User"—a class of network users which includes information on employees or visitors. It is a sub-class of the "Organizational-Person" class.

"Person"—a class which stores personal information on the user.

Various attributes are used to describe classes—for example, "Address", "Department", "Employee-ID", "E-mail-Address", "Title", and other parameters. The classes are also linked to each other by logical links, which allows to define a user's connection parameters or the set of the programs used for work. The user is also matched with his/her devices. To define them, several classes are also used, such as:

"Device"—the main class for storage of data on physical network devices;

"Computer"—an account class for a network computer.

To describe device classes, the following attributes are used: "Machine-Role", "Managed-By, Owner", "Network-Address", "Operating-System", "Proxy-Addresses", and others.

A created task is a data structure composed of parameters which can be viewed as IDs of devices, users, or applications. Using these IDs, the task manager module 210 sends a request to the directory service 110, which results in an organized set of attributes that characterize each object of the task. The task manager loads the received attributes in the analyzer 230, which interprets attribute values into security parameter values. The interpretation rules are based on the security policy. Below are some examples of matches between user attributes and security agent parameters.

In one example, all human resource department users need remote access to the internal HR system, so if the installation task covers a device managed by a user from the HR (Human Resources) group, then a certificate and the settings for the access to the internal HR system will be added to the installation package 131. Therefore, an example of the analyzer 230 rule for this case in the form of the "if" clause will look as follows:

IF {department==HR} THEN {certificate=add}, where "department" is an attribute of the user's department, and "certificate" is a certificate addition parameter.

The security policy for company couriers takes into account their frequent travel, which increases the risk of infection of devices when connected to outside networks and the risk of loss of computer devices storing corporate data. For this group of employees, as well as for all the devices which are often connected in locations outside the office, the installation package 141 of the security agent must include an additional container with a safe browser and an agent setup, where the "GPS tracking" (tracking of coordinates) and the device locking function (if the device is inactive for a certain period of time) can be activated. This security policy requirement corresponds to the following analyzer 230 rule:

IF {title==courier OR location!=local}

THEN {safe_browser=add AND GPS=ON)}, where "safe_browser" is the parameter of addition of the protected browser component, and "GPS" is the parameter of the location tracking function activation.

Once one or all rules of the analyzer 230 have functioned, the resulting parameters are used to configure the installation package 131. The configurator module 240 can be implemented by a set of functions called depending on the input parameters. For the above examples, the configurator module 240 can include a certificate addition function, a component addition function, and a settings change function. The setup of an application can be performed using scripts (processed by the security agent itself, the operating system or another tool, such as an administration agent or an installation manager) executed during the launch of the installation package. Another approach for applying settings is to modify application resources (configuration files, executable files, resource files, registry keys, etc.). The installation package can contain not only modified installation files, but also can be expanded and can include additional programs, libraries, resource files or updates, which will be installed and applied during the security agent installation. Then, the configured installation package is saved by the task manager or directly by the configurator in the file storage arrangement 140.

Then, the configured installation package 141 is saved by the task manager module 210 or directly by the configurator module 240 in the file storage arrangement 140. The obtained parameters are used to configure not only the installation package, but also the data transfer channel. This approach recognizes that the method for transferring a file to a user device also depends on the device itself; for example, the physical location of the device on the network, the presence of necessary communication modules in the device, the network connection method (remote or local). If the device is connected to the administration server through the Internet, the transfer channel may need to be encrypted in some cases. The data transfer channel in the context of this document is provided by an administration server service, based on data transfer networks of various communication technologies, such as, for instance, Ethernet, Wi-Fi, GSM, CDMA, UMTS, LTE. Configuring a data transfer channel in this case involves determining the type of the data transfer network and identifying the address for data delivery (IP address, mobile telephone number, e-mail, personal account, etc.). In some embodiments, the configuration of the channel (selection of the data transfer protocol) can also depend on the data transfer speed—CSD, GPRS, EDGE, the HSPA family, 802.11b/g/n, etc.

Figure 3:
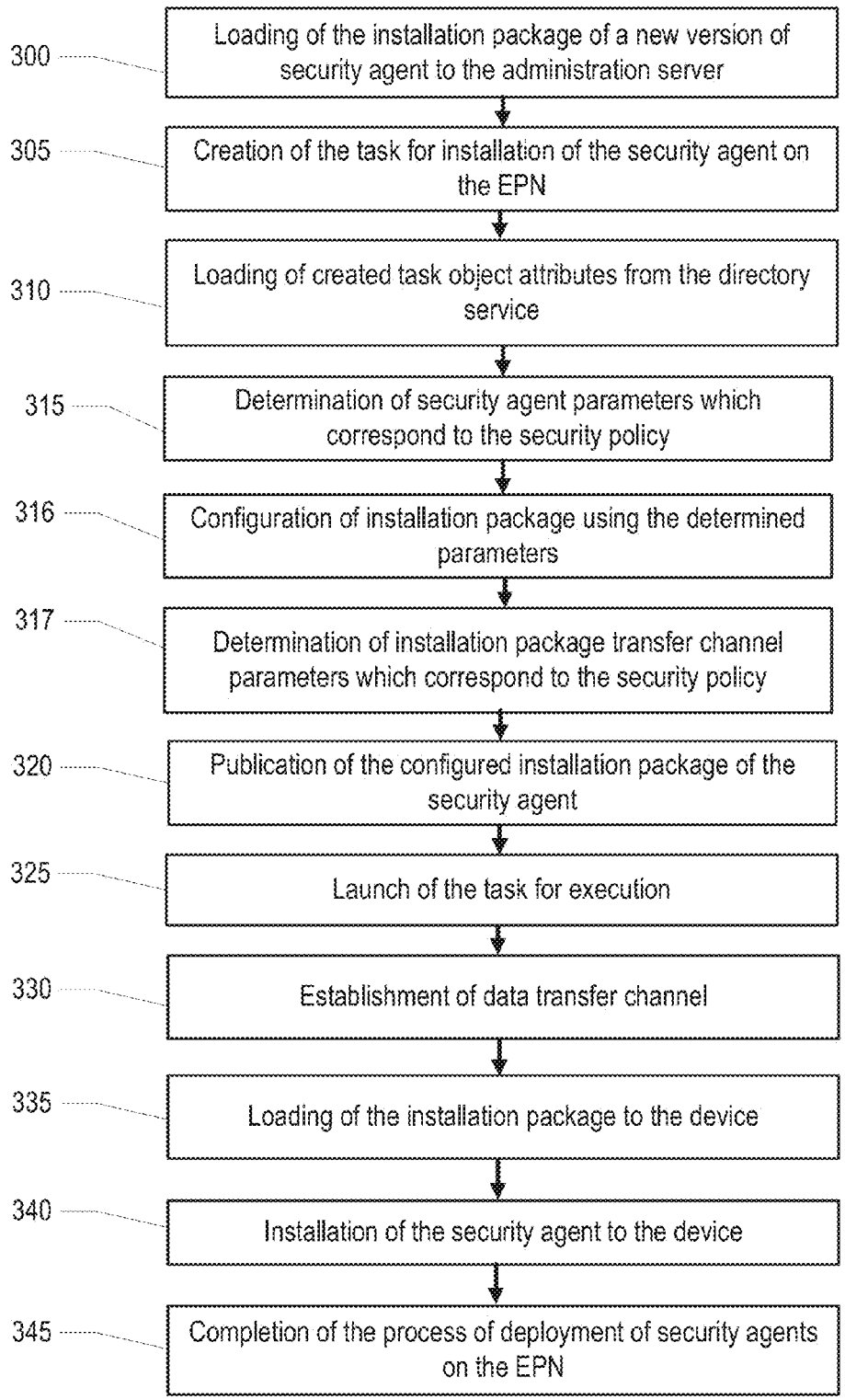
FIG. 3 is a flow diagram illustrating an exemplary process of operation of the system of FIGS. 1 and 2 according to one embodiment.

A method for deploying pre-configured security agents is illustrated in the flow diagram shown in FIG. 3. The method begins with the loading, at 300, of the installation package of a new version of the security agent to the administration server or to a file storage (if it is not included in the administration server structure). This is followed by the creation of an installation task at 305. The installation task can be created by the network administrator or created automatically using a rule. An example of such rule can be automatic installation of the agent when a new version is issued, or installation of the agent to all connected devices with no security tools. The task can also be created by user request when a web service is accessed. At 310, after the creation of the installation task, the attributes of the task's objects are determined by creating a request to the directory service and by loading the located attributes.

If the device was not previously connected to the network and if the directory service does not have information on this device, the user can pass the device registration process; to do this, he/she logs in a special web service, obtains authorization there and specifies the characteristics of the personal device. The registration of the device can be performed using plugins, which are loaded and installed upon connection to the specified web service; thereafter, the device configuration is obtained and sent to the administration server. The loaded attributes of the device are saved in the directory service and used to configure installation packages for the device.

After the creation of the installation task, the installation package and the data transfer channel are set up. These processes can occur either sequentially (as illustrated in FIG. 3) or simultaneously. Using the loaded attributes of the user, device, and other objects related to them contained in the directory service, block 315 determines the parameters of the security agent intended for that user and device, which meet the security policy. This is followed by the configuration of the installation package at 316, including the addition of components, certificate and configuration files, modification of security agent files (resource files, executable files, etc.), addition of installation scenarios for processing by the installation manager, and other actions required in order to take into account the specific features of the user and the device configuration during installation and operation of the security agent.

The determination of installation package transfer channel parameters which correspond to the security policy and device type is performed at 317. This can occur after the configuration of the installation package, or concurrently therewith. The configured installation package 141 is saved in the file storage and published at 320. Publication in this example involves determination of a hyperlink and the setup of access rights to files and network resources, so that the installation package 141 and the required installation files would be accessible for loading using the specified hyperlink.

When the installation task is launched for execution as scheduled, upon completion of the previous stages, or manually by the administrator, at 325, the data transfer channel 330 is established first with each of the devices; then, the installation package 335 is loaded. In case of successful loading, the installation package is launched and the security agent is installed on the device at 340; after this, the process of security agents deployment on the EPN concludes at 345.

The data transfer channel can be represented by a web service described above, which is configured so that it reflects the link to the installation package in accordance with the device and for the user for which the installation package was configured.

There is a large variety of data transfer channel types that can be used to transfer installation files to user devices. The following examples illustrated in connection with FIGS. 4A-4C are practical and user-friendly methods for transferring files to portable devices that have no administration agents.

Figure 4A:
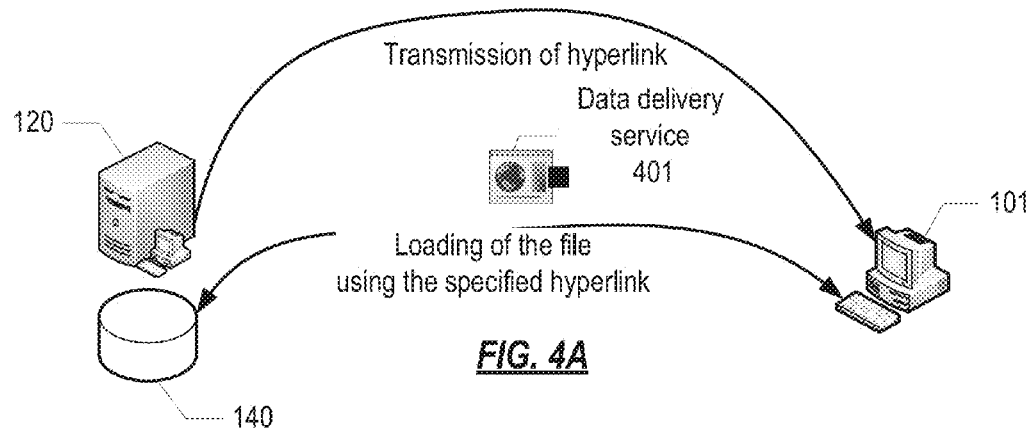
FIG. 4A is a diagram illustrating an example of loading of an installation package using a hyperlink sent by a data supply service according to one embodiment.

FIG. 4A illustrates one approach in which the loading of an installation package is performed using a hyperlink sent by a data delivery service 401. A data delivery service 401 in this case can be a mail service, a web service, a messaging application and other tool capable of supplying a hyperlink to a user. The choice of the data delivery service 401 also depends on the information on the device 101 and the user, obtainable from the directory service. For example, the administration server 120 has information on the user's email; then, a message (e-mail) is generated on the server 120; and the link to the published files is inserted in the body of the email. Having received the email and having activated the link, the user moves to the installation page, from where he/she can load the installation package 141. The link can point directly to the installation package 141, then clicking on the link will automatically cause the loading of the file. After the installation package is loaded from the file storage arrangement 140 to the user's device 101, the only thing to be done to complete the installation is to run the loaded file.

Figure 4B:
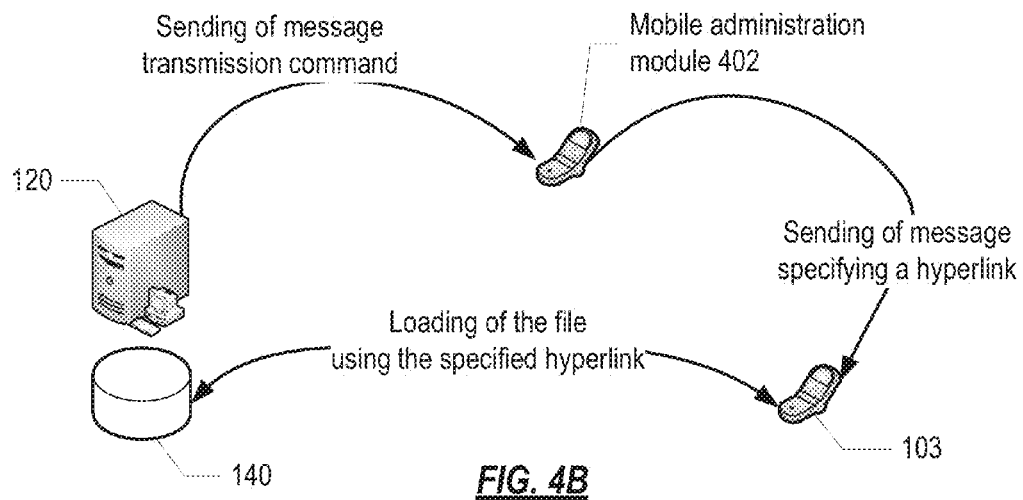
FIG. 4B is a diagram illustrating an example of loading of an installation package using a hyperlink sent through mobile communication networks according to a one embodiment.
Figure 4C:
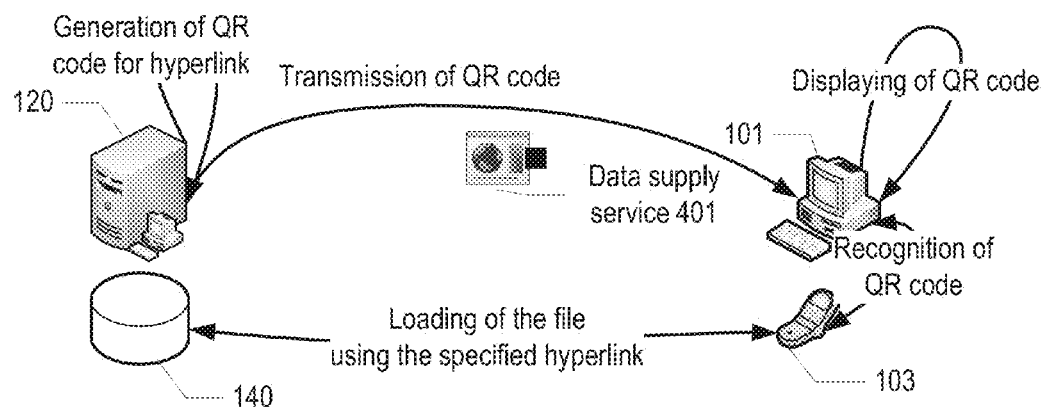
FIG. 4C is a diagram illustrating an example of the loading of an installation package using a hyperlink sent in the QR code format according to a one embodiment.

FIG. 4B is a schematic diagram illustrating another approach according to one embodiment for loading an installation package using a hyperlink sent through mobile communication networks. A channel for transfer of short messages (for example, SMS or MMS messages) can also be used to deliver managing messages and links to published installation packages. To support an SMS messaging service, companies may either purchase special equipment or adapt their software for outside SMS messaging service protocols and make contracts with SMS service providers, which is not always convenient. One option to implement the mobile messaging function within a standard mobile network without using additional equipment is to use a mobile application connected to a mobile administration module 402. Such mobile administration module 402 is connected on one side to an administration server 120 and on the other side to a mobile network (for example, of GSM or CDMA standard).

The administration server 120 generates a message which includes a link to a published installation package 141 and the recipient's telephone number, corresponding to the user of the end device in the directory service. After that, the generated message is sent through a computer network or any other available communication interface to the mobile administration module 402. When connected to a mobile network, the mobile administration module 402 sends a message to the user's mobile device 103. When the message is delivered to the user, the installation package is loaded using the specified link, and the security agent is launched on the user device 103.

To receive a link to a portable device that does not have a mobile communication module for operation in GSM or CDMA networks (for example, a tablet computer), it is possible to use a mail service in order to send a hyperlink, as depicted in FIG. 4A.

In case if the directory service does not contain the personal mail address of the tablet computer owner, but specifies only a corporate address, the hyperlink to the installation package 141 is sent through the user's desktop computer. FIG. 4C is a schematic diagram that illustrates the loading of an installation package using a hyperlink sent in the quick response (QR) code format, e.g., an exemplary type of bar code. The administration server 120 creates an e-mail with a link to the installation package 141 configured for the user's portable device, but sends the link to a desktop computer controlled by the user. To simplify the input of the hyperlink to the portable device from a computer, a graphical representation of the hyperlink, such as a QR code, is used. The administration server 120 generates a QR code for the link and sends the link to the user's computer connected to the corporate mail. The link in the form of a QR code can also be published on the personal page of a corporate web service user. Another method for the transfer of the hyperlink can be a message with an attached image file containing a QR code, sent using quick messaging tools or in an MMS message.

Figure 5:
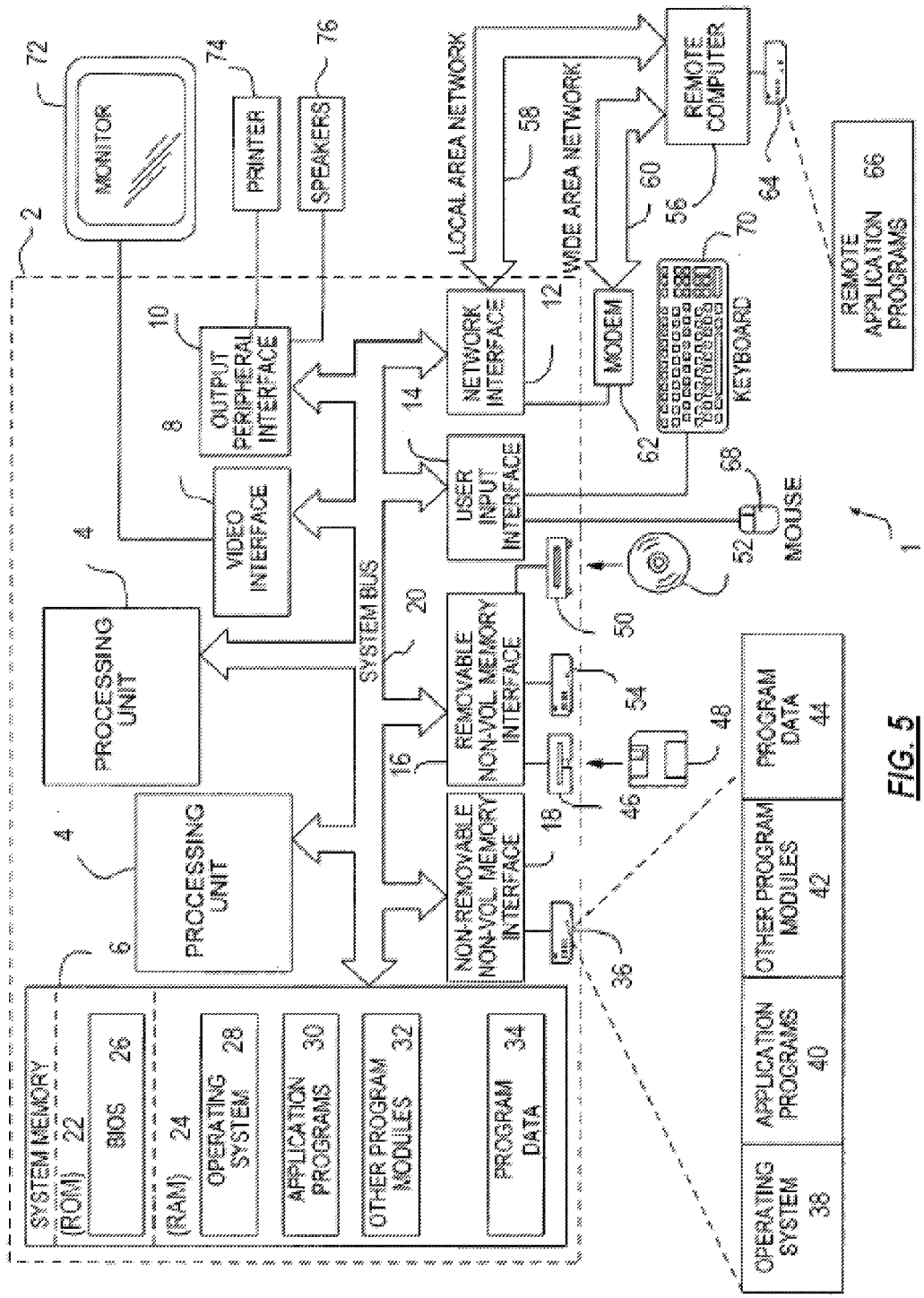
FIG. 5 is a block diagram illustrating an example of a general-purpose computer system on which aspects of the invention may be carried out.

FIG. 5 is a diagram illustrating in greater detail a computer system 1 on which aspects of the invention as described herein may be implemented according to various embodiments. The computer system 1 may include a computing device such as a personal computer 2. The personal computer 2 includes one or more processing units 4, a system memory 6, a video interface 8, an output peripheral interface 10, a network interface 12, a user input interface 14, removable 16 and non-removable 18 memory interfaces and a system bus or high-speed communications channel 20 coupling the various components. In various embodiments, the processing units 4 may have multiple logical cores that are able to process information stored on computer readable media such as the system memory 6 or memory attached to the removable 16 and non-removable 18 memory interfaces 18. The computer 2 system memory 6 may include non-volatile memory such as Read Only Memory (ROM) 22 or volatile memory such as Random Access Memory (RAM) 24. The ROM 22 may include a basic input/output system (BIOS) 26 to help communicate with the other portion of the computer 2. The RAM 24 may store portions of various software applications such as the operating system 28, application programs 30 and other program modules 32. Further, the RAM 24 may store other information such as program or application data 34. In various embodiments, the RAM 24 stores information that requires low-latencies and efficient access, such as programs and data being manipulated or operated on. In various embodiments RAM 24 comprises Double Data Rate (DDR) memory, Error Correcting memory (ECC) or other memory technologies with varying latencies and configurations such as RAMBUS or DDR2 and DDR3. In this way, in various embodiments, the system memory 6 may store the input data store, access credential data store, operating memory data store, instruction set data store, analysis result data store and the operating memory data store.

Further, in various embodiments, the processing units 4 may be configured to execute instructions that limit access to the aforementioned data stores by requiring access credential before access to the information is granted.

The removable 16 and non-removable 18 memory interfaces may couple the computer 2 to disk drives 36 such as SSD or rotational disk drives. These disk drives 36 may provide further storage for various software applications such as the operating system 38, application programs 40 and other program modules 42. Further, the disk drives 36 may store other information such as program or application data 44. In various embodiments, the disk drives 36 store information that doesn't require the same low-latencies as in other storage mediums. Further, the operating system 38, application program 40 data, program modules 42 and program or application data 44 may be the same information as that stored in the RAM 24 in various embodiments mentioned above or it may be different data potentially derivative of the RAM 24 stored data.

Further, the removable non-volatile memory interface 16 may couple the computer 2 to magnetic portable disk drives 46 that utilize magnetic media such as the floppy disk 48, Iomega® Zip or Jazz, or optical disk drives 50 that utilize optical media 52 for storage of computer readable media such as Blu-Ray®, DVD-R/RW, CD-R/RW and other similar formats. Still other embodiments utilize SSD or rotational disks housed in portable enclosure 54 to increase the capacity of removable memory.

The computer 2 may utilize the network interface 12 to communicate with one or more remote computers 56 over a local area network (LAN) 58 or a wide area network (WAN) 60. The network interface 12 may utilize a Network Interface Card (NIC) or other interface such as a modem 62 to enable communication. The modem 62 may enable communication over telephone lines, coaxial, fiber optic, powerline, or wirelessly. The remote computer 56 may contain a similar hardware and software configuration or may have a memory 64 that contains remote application programs 66 that may provide additional computer readable instructions to the computer 2. In various embodiments, the remote computer memory 64 can be utilized to store information such as identified file information that may be later downloaded to local system memory 6. Further, in various embodiments the remote computer 56 may be an application server, an administrative server, client computers, or a network appliance.

A user may enter information to the computer 2 using input devices connected to the user input interface 14 such as a mouse 68 and keyboard 70. Additionally, the input device may be a trackpad, fingerprint scanner, joystick, barcode scanner, media scanner or the like. The video interface 8 may provide visual information to a display such as a monitor 72. The video interface 8 may be an embedded interface or it may be a discrete interface. Further, the computer may utilize a plurality of video interfaces 8, network interfaces 12 and removable 16 and non-removable 18 interfaces in order to increase the flexibility in operation of the computer 2. Further, various embodiments utilize several monitors 72 and several video interfaces 8 to vary the performance and capabilities of the computer 2. Other computer interfaces may be included in computer 2 such as the output peripheral interface 10. This interface may be coupled to a printer 74 or speakers 76 or other peripherals to provide additional functionality to the computer 2.

Various alternative configurations and implementations of the computer are within the spirit of the invention. These variations may include, without limitation, additional interfaces coupled to the system bus 20 such as universal serial bus (USB), printer port, game port, PCI bus, PCI Express or integrations of the various components described above into chipset components such as the northbridge or southbridge. For example, in various embodiments, the processing unit 4 may include an embedded memory controller (not shown) to enable more efficient transfer of data from the system memory 6 than the system bus 20 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A system for automated deployment of a software application to be installed, via a software installation package provided over a computer network, onto a plurality of different user devices for a plurality of different users, the system comprising:

a set of instructions executable by computing hardware and stored in a non-transitory storage medium that, when executed, cause the computing hardware to implement:

a task manager module that obtains an initial software installation package, and automatically communicates with a network attributes data store via the computer network to obtain information representing (a) associations between the plurality of users and the plurality of user devices, (b) user attributes from which access privilege level information for individual users is determinable, and (c) device attributes for each of the plurality of user devices, including network connectivity information;

a configurator module that:

determines a user-associated security policy requirement based on the obtained information representing (a), (b), and (c);

custom-configures the initial software installation package for individual ones of the plurality of user devices based on the obtained information to produce a plurality of different specially-configured software installation packages, each one of which corresponds to one or more specific users and one or more specific user devices, wherein each specially-configured software installation package includes installation parameters that establish functionality for the software application based on the access privilege level of the corresponding one or more specific users and on the user-associated security policy requirement; and determines a type of data transfer network and a type of destination address, based on the obtained information for each one of the user devices to receive the software installation package delivery;

selects and custom-configures data transfer channels for delivering the specially-configured software installation packages to respective individual ones of the plurality of user devices based on the obtained information, and further based on the determined type of data transfer network and the determined type of destination address for each one of the user devices, each data transfer channel being automatically selected by the configurator module from among a plurality of different operative data transfer channels, each of the plurality of different operative data transfer channels configured to meet the security policy requirement such that data transfer channels incompatible with the security policy requirement are excluded from the plurality of different operative data transfer channels, and each selected data transfer channel corresponding to one or more specific users and one or more specific user devices, wherein each selected data transfer channel is associated with a selected data transfer protocol determined by the configurator module to meet the security policy requirement for the one or more specific user devices from among a set of different available data transfer protocols.

2. The system of claim 1, wherein the software application is a security application user agent.

3. The system of claim 1, wherein the functionality for the software application based on the access privilege level of the corresponding one or more specific users includes a capability to provide certain access credential information.

4. The system of claim 1, wherein the configurator module is adapted to produce each specially-configured software installation package such that the installation parameters establish functionality based further on the device attributes corresponding to the one or more user devices.

5. The system of claim 1, wherein the task manager module is adapted to obtain information representing a security policy, and wherein the configurator module is adapted to produce each specially-configured software installation package such that the installation parameters establish functionality based further on that security policy.

6. The system of claim 5, wherein the configurator module applies a set of expert rules to produce each specially-configured software installation package, wherein the set of expert rules define various software installation package parameter settings according to various characteristics of the security policy.

7. The system of claim 1, wherein the network attributes data store includes a directory service.

8. The system of claim 1, wherein the task manager module and the configurator module are executed on an administration server that is remotely situated from, but communicatively coupled to, the plurality of user devices and the network attributes data store.

9. The system of claim 1, wherein user attributes from which the access privilege level information for individual users is determinable includes at least one attribute selected from the group consisting of: a title or role of the user in an organization; a configuration of the user device, attributes of a network connection between the user device and the task manager module, a list of network resources accessible to the user via the user device; an identification of an organization to which the user is assigned.

10. The system of claim 1, wherein the configurator module is communicatively coupled to a data delivery service module that supplies a link to a data store from which each specially-configured software installation package is downloadable by each user device.

11. The system of claim 1, wherein the configurator module is communicatively coupled to a mobile device administration module that supplies a link to a data store from which each specially-configured software installation package for user devices that are mobile devices is downloadable by each user device via a messaging service specific to mobile devices.

12. The system of claim 1, wherein the network connectivity information in (b) includes at least one attribute selected from the group consisting of: a physical location of the user device, a presence of one or more certain communication modules on a user device, a mode of network connectivity employed by a user device, or any combination thereof.

13. The system of claim 1, wherein the configurator module custom-configures each data transfer channel differently in response to each item of network connectivity information that relates to mode of connectivity selected from among wired or wireless modes of network connectivity.

14. The system of claim 1, wherein the configurator module custom-configures each data transfer channel differently in response to each item of network connectivity information that relates to mode of connectivity selected from among local area network and wide area network connectivity.

15. The system of claim 1, wherein the configurator module custom-configures each data transfer channel differently in response to each item of network connectivity information that relates to mode of connectivity selected from among relatively low-bandwidth connectivity, and relatively high-bandwidth connectivity.

16. The system of claim 1, wherein the configurator module custom-configures each data transfer channel to include a certain degree of data encryption in response to each item of network connectivity information relating to security risk.

17. A method for automated deployment of a software application to be installed, via a software installation package provided over a computer network, onto a plurality of different user devices for a plurality of different users, the method comprising:

obtaining an initial software installation package, and information representing (a) associations between the plurality of users and the plurality of user devices, (b) user attributes from which access privilege level information for individual users is determinable, and (c) device attributes for each of the plurality of user devices, including network connectivity information;

determining a user-associated security policy requirement based on the obtained information representing (a), (b), and (c);

custom-configuring the initial software installation package for individual ones of the plurality of user devices based on the obtained information to produce a plurality of different specially-configured software installation packages, each one of which corresponds to one or more specific users and one or more specific user devices, wherein each specially-configured software installation package includes installation parameters that establish functionality for the software application based on the access privilege level of the corresponding one or more specific users;

determining a type of data transfer network and a type of destination address for each one of the user devices to receive the software installation package delivery;

selecting and custom-configuring data transfer channels for delivering the specially-configured software installation packages to respective individual ones of the plurality of user devices based on the obtained information, and further based on the determined type of data transfer network and the determined type of destination address for each one of the user devices, each data transfer channel being automatically selected by the configurator module from among a plurality of different available operative data transfer channels, each of the plurality of different operative data transfer channels configured to meet the security policy requirement such that data transfer channels incompatible with the security policy requirement are excluded from the plurality of different operative data transfer channels, and each selected data transfer channel corresponding to one or more specific users and one or more specific user devices, wherein each selected data transfer channel is associated with a selected data transfer protocol determined to meet the security policy requirement for the one or more specific user devices from among a set of different available data transfer protocols.

18. The method of claim 17, further comprising:
supplying, to each user device, a link to a data store from which each specially-configured software installation package is downloadable by each user device.

19. The method of claim 17, further comprising:
supplying, to each user device that is a mobile user device, a link to a data store from which each specially-configured software installation package is downloadable by each mobile user device via a messaging service specific to mobile devices.

20. The method of claim 17, wherein custom-configuring data transfer channels includes configuring each data transfer channel differently in response to each item of network connectivity information that relates to mode of connectivity selected from among wired or wireless modes of network connectivity.

21. The method of claim 17, wherein custom-configuring data transfer channels includes configuring each data transfer channel differently in response to each item of network connectivity information that relates to mode of connectivity selected from among local area network and wide area network connectivity.

22. The method of claim 17, wherein custom-configuring data transfer channels includes configuring each data transfer channel differently in response to each item of network connectivity information that relates to mode of connectivity selected from among relatively low-bandwidth connectivity, and relatively high-bandwidth connectivity.

23. The method of claim 17, wherein custom-configuring data transfer channels includes configuring each data transfer channel to include a certain degree of data encryption in response to each item of network connectivity information relating to security risk.

* * * * *